United States Patent
Aoyagi

(10) Patent No.: US 9,090,262 B2
(45) Date of Patent: Jul. 28, 2015

(54) CONTROL APPARATUS FOR VEHICLE

(75) Inventor: Takeshi Aoyagi, Toyota (JP)

(73) Assignee: DENSO CORPORATION, Kariya (JP)

( * ) Notice: Subject to any disclaimer, the term of this patent is extended or adjusted under 35 U.S.C. 154(b) by 588 days.

(21) Appl. No.: 13/302,249

(22) Filed: Nov. 22, 2011

(65) Prior Publication Data

US 2012/0130597 A1 May 24, 2012

(30) Foreign Application Priority Data

Nov. 22, 2010 (JP) ................................ 2010-259681

(51) Int. Cl.
- *B60W 30/18* (2012.01)
- *B60W 10/06* (2006.01)
- *B60W 10/26* (2006.01)
- *B60W 10/30* (2006.01)

(52) U.S. Cl.
CPC ......... *B60W 30/18127* (2013.01); *B60W 10/06* (2013.01); *B60W 10/26* (2013.01); *B60W 10/30* (2013.01); *B60W 2510/244* (2013.01); *B60W 2520/10* (2013.01); *B60W 2540/10* (2013.01); *B60W 2540/12* (2013.01); *B60W 2550/142* (2013.01); *B60W 2710/244* (2013.01)

(58) Field of Classification Search
CPC ............ B60G 17/0195; B60R 16/0315; B60T 8/1755; B60T 8/447; B60T 8/17616; B60T 8/17636; B60T 8/175; B60W 10/20; B60W 10/06; B60W 10/26; B60W 10/30; B60W 30/18127; B60W 2510/244; B60W 2520/10; B60W 2540/10; B60W 2540/12; B60W 2550/142; B60W 2710/244
USPC .......................................................... 701/48
See application file for complete search history.

(56) References Cited

U.S. PATENT DOCUMENTS

| | | | |
|---|---|---|---|
| 5,280,231 | A | 1/1994 | Kato et al. |
| 5,412,323 | A | 5/1995 | Kato et al. |
| 2009/0017350 | A1 | 1/2009 | Umayahara |

FOREIGN PATENT DOCUMENTS

| | | |
|---|---|---|
| JP | A-4-236136 | 8/1992 |
| JP | A-8-26098 | 1/1996 |
| JP | A-2001-268719 | 9/2001 |
| JP | A-2003-335128 | 11/2003 |
| JP | A-2006-310217 | 11/2006 |
| JP | A-2009-196457 | 9/2009 |

OTHER PUBLICATIONS

Dec. 17, 2013 Office Action issued in Japanese Patent Application No. 2010-259681 (with translation).

*Primary Examiner* — James Trammell
*Assistant Examiner* — James E Stroud
(74) *Attorney, Agent, or Firm* — Oliff PLC

(57) ABSTRACT

A control apparatus for a vehicle that is capable of enhancing fuel efficiency of an internal-combustion engine. The vehicle is provided with at least one electronically controllable vehicle-mounted accessory that can be driven by the engine, and energy storage means for storing energy generated by the at least one vehicle-mounted accessory being driven by the engine. The apparatus includes regenerative control means for performing regenerative control during deceleration of the vehicle according to a deceleration instruction from a driver, and drive-control means for performing drive-control of the at least one vehicle-mounted accessory during a vehicle running period other than a regenerative control period so that the energy storage means has a margin in energy storage capacity for storing energy to be generated by the at least one vehicle-mounted accessory being driven by the engine during the regenerative control.

11 Claims, 3 Drawing Sheets

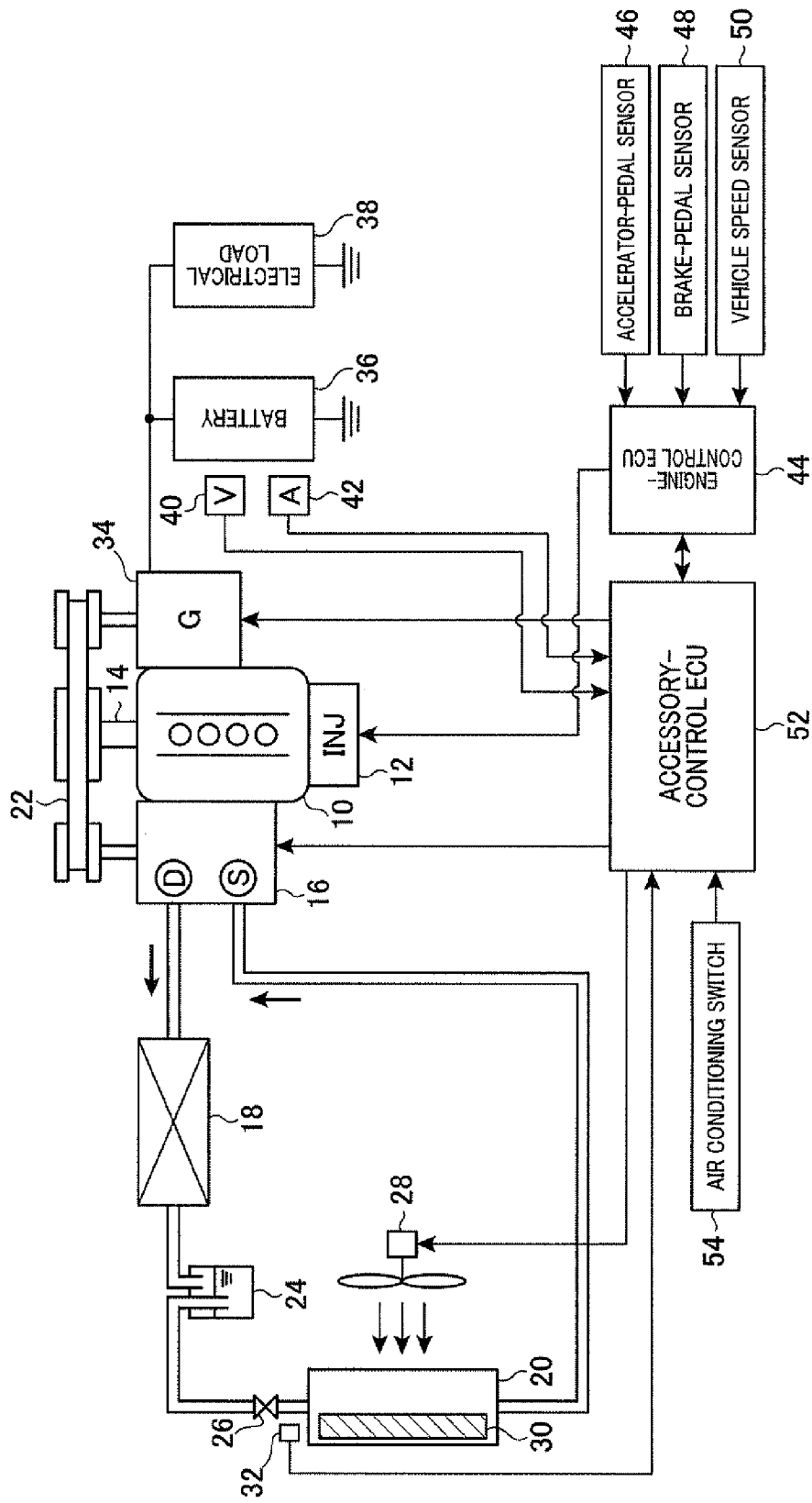

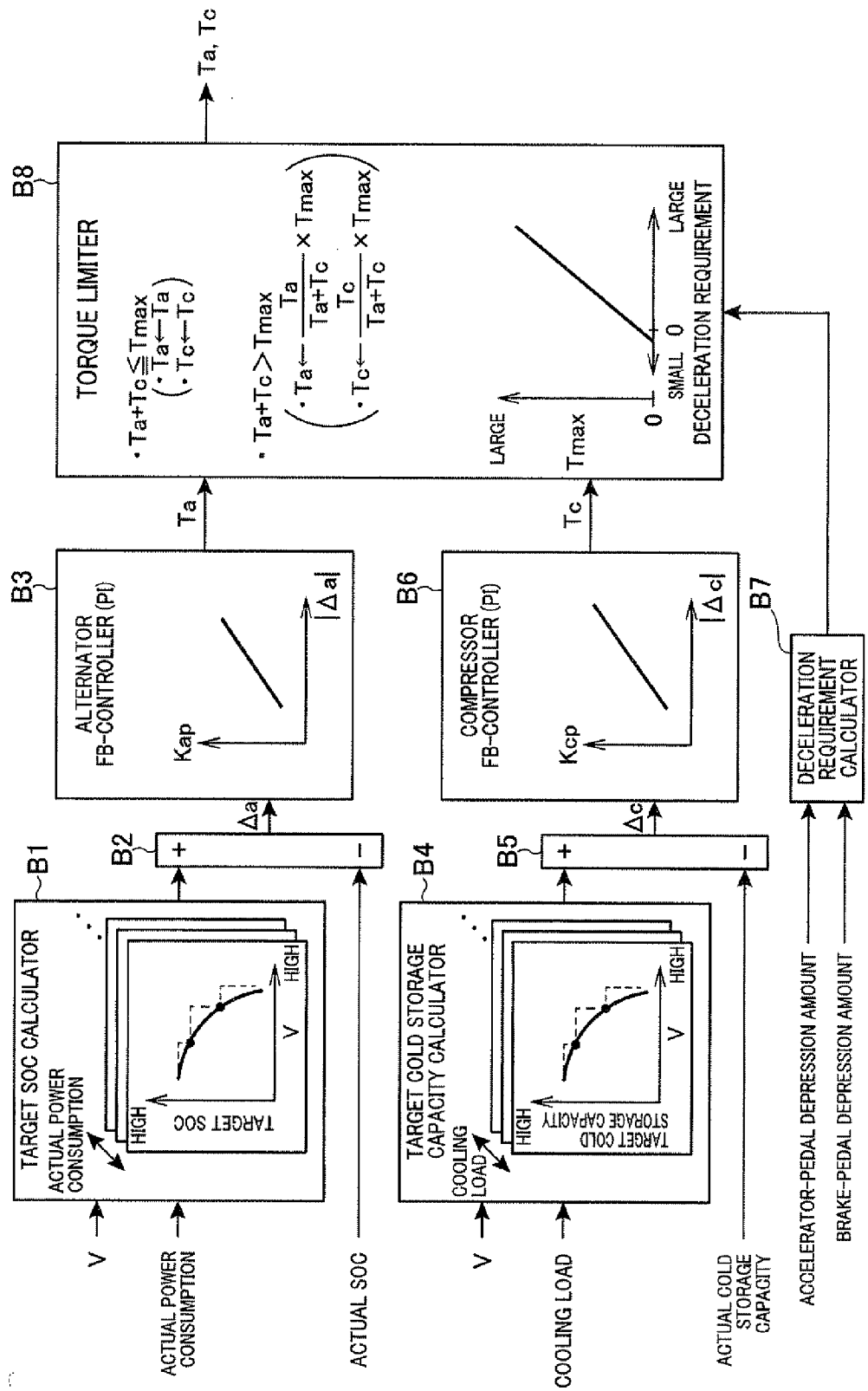

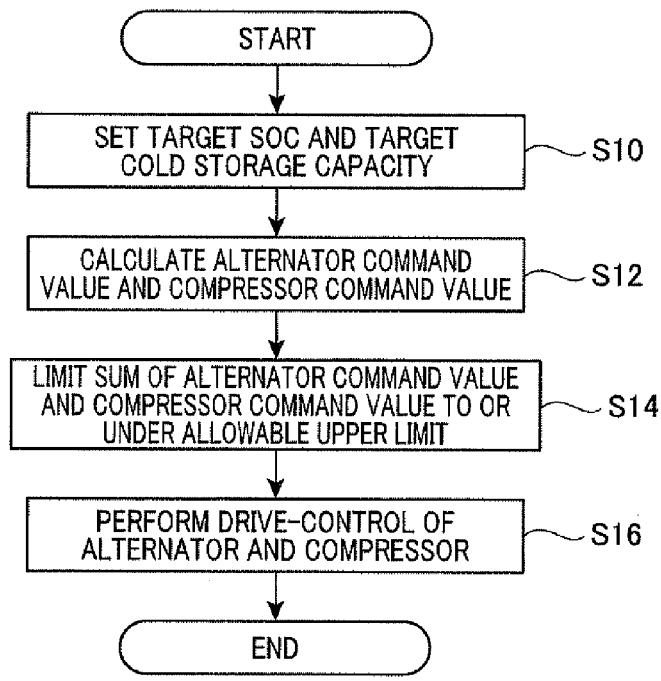
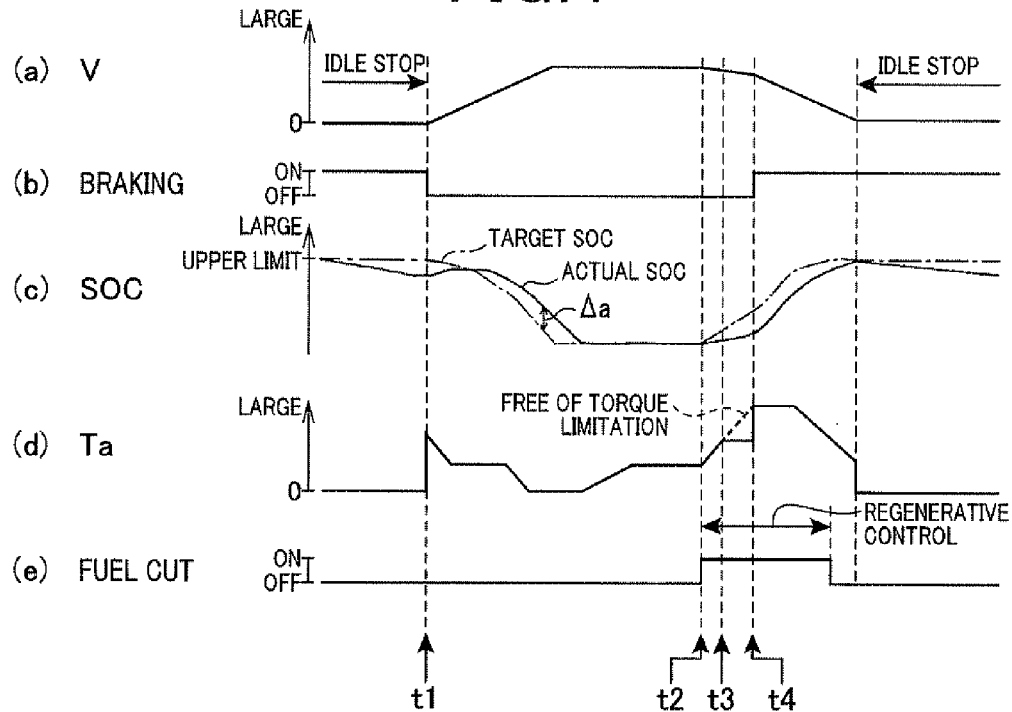

CONTROL APPARATUS FOR VEHICLE

CROSS-REFERENCE TO RELATED APPLICATION

This application is based on and claims the benefit of priority from earlier Japanese Patent Application No. 2010-259681 filed Nov. 22, 2010, the description of which is incorporated herein by reference.

BACKGROUND 1. (Technical Field)

This invention relates to a control apparatus for a vehicle provided with an electronically controllable vehicle-mounted accessory to be driven by an internal-combustion engine and energy storage means for storing energy generated by driving the vehicle-mounted accessory, which apparatus is capable of conducting regenerative control to convert kinetic energy of the vehicle into drive energy of the vehicle-mounted accessory during deceleration of the vehicle according to (or in response to) a driver's instruction.

2. (Related Art)

A known control apparatus, as disclosed in Japanese Patent Application Publication No. 2009-196457, performs regenerative control by driving vehicle-mounted accessories to convert kinetic energy of the vehicle into drive energy of the vehicle-mounted accessories during a fuel-cut period of time when the vehicle is decelerating. More specifically, a vehicle battery is charged with electrical energy generated by driving a generator, which is a vehicle-mounted accessory, during the regenerative control. This can reduce a subsequent frequency at which the generator is driven to charge the battery, thereby enhancing fuel efficiency of the internal-combustion engine.

In the conventional apparatus as described above, however, when a state of charge (SOC) of the battery is already at an adequately high level before the regenerative control, kinetic energy of the vehicle cannot be effectively used as electrical power output of the generator through the regenerative control, which may reduce the fuel efficiency of the internal-combustion engine.

In general, the generator and other vehicle-mounted accessories to be driven by the internal-combustion engine cannot effectively use kinetic energy of the vehicle as drive energy of the vehicle-mounted accessories through the regenerative control, which may reduce fuel efficiency of the internal-combustion engine.

In consideration of the foregoing, exemplary embodiments of the present invention are directed to providing a control apparatus for a vehicle capable of effectively using kinetic energy of the vehicle as drive energy of the vehicle-mounted accessories through the regenerative control, thereby enhancing the fuel efficiency of the internal-combustion engine.

SUMMARY

In accordance with an exemplary aspect of the present invention, there is provided a control apparatus for a vehicle. The vehicle is provided with at least one electronically controllable vehicle-mounted accessory that can be driven by an internal-combustion engine, and energy storage means for storing energy generated by the at least one vehicle-mounted accessory being driven by the engine. The apparatus includes: regenerative control means for performing regenerative control during deceleration of the vehicle according to a deceleration instruction from a driver of the vehicle by driving the at least one vehicle-mounted accessory to convert kinetic energy of the vehicle into drive energy of the at least one vehicle-mounted accessory; and drive-control means for performing drive-control of the at least one vehicle-mounted accessory during a vehicle running period other than a regenerative control period so that the energy storage means has a margin in energy storage capacity for storing energy to be generated by the at least one vehicle-mounted accessory being driven by the engine during the regenerative control.

With this configuration, the regenerative control is performed to convert the kinetic energy of the vehicle into the drive energy of the vehicle-mounted accessory. The vehicle-mounted accessory is drive-controlled during a vehicle running period other than the regenerative control period so that the energy storage means has a margin in energy storage capacity for storing energy to be generated by the vehicle-mounted accessory being driven during the regenerative control. This enables the energy storage means to properly store energy generated by the regenerative control, which leads to enhancement of fuel efficiency of the internal-combustion engine.

BRIEF DESCRIPTION OF THE DRAWINGS

In the accompanying drawings:

FIG. 1 schematically shows a collection of an engine system, an air-conditioning system and a power generation system, to which a control apparatus for a vehicle can be applied in accordance with one embodiment of the present embodiment;

FIG. 2 schematically shows a functional block diagram for drive control of vehicle-mounted accessories;

FIG. 3 schematically shows a flowchart of drive control of vehicle-mounted accessories; and FIG. 4 schematically shows a timing chart for drive control of vehicle-mounted accessories.

DESCRIPTION OF SPECIFIC EMBODIMENTS

The present invention will be described more fully hereinafter with reference to the accompanying drawings. Like numbers refer to like elements throughout.

FIG. 1 is a schematic view showing a collection of an engine system, an air-conditioning system and a power generation system, to which a control apparatus for a vehicle can be applied in accordance with one embodiment of the present embodiment.

As shown in FIG. 1, each cylinder of an engine 10 is provided with a fuel injection valve 12 from which an air-fuel mixture is supplied into a combustion chamber (not shown) of the engine 10 for combustion. Energy generated in the combustion of the air-fuel mixture is used as rotary power for an output shaft (crankshaft 14).

The air-conditioning system includes a compressor 16 that suctions and discharges a refrigerant to circulate the refrigerant in a refrigerating cycle, a condenser 18, and an evaporator 20.

The compressor 16, which is also rotationally driven by the rotating crankshaft 14 via the belt 22, is a continuously variable displacement type compressor including an electromagnetically-driven control valve therein (not shown). Power supply to the valve is controlled so as to variably set a discharge capacity of refrigerant in a continuous manner during rotationally driving of the compressor 16. More specifically, as the refrigerant discharge capacity of the compressor 16 becomes larger, a drive torque (also referred to as a compressor torque) of the compressor 16 is increased.

In the following, it is assumed that the compressor 16 is in operation when the discharge capacity is larger than 0 and is in a suspended state when the discharge capacity is equal to 0.

The condenser 18 performs heat exchange between the refrigerant discharged from the compressor 16 and air blown against the condenser 18 while the vehicle is running and/or air fed from a compressor fan (not shown) rotationally driven by a DC-motor or the like. The receiver 24 separates a liquid refrigerant from the refrigerant fed from the condenser 18 via vapor-liquid separation, and temporarily stores the liquid refrigerant therein (in the receiver) to supply only the liquid refrigerant to the downstream side. The liquid refrigerant stored in the receiver 24 is rapidly expanded through the thermal expansion valve 26 to be nebulized. The nebulized refrigerant is supplied to an evaporator 20 that cools air in the passenger compartment. In the evaporator 20, some or all of the nebulized refrigerant is vaporized through heat exchange between air fed from an evaporator fan 28 rotationally driven by a DC-motor and the nebulized refrigerant. This allows air fed from the evaporator fan 28 to be cooled and then supplied to the passenger compartment via the air blowoff port (not shown) provided in the compartment.

The evaporator 20 serves as a heat accumulator having a cold-storage agent 30 (e.g., paraffin) encapsulated therein for storing heat of the refrigerant, which stores a surplus of heat for air conditioning produced in the refrigeration cycle during driving of the compressor 16. The heat stored is used for air-conditioning in a period of time when the compressor 16 is suspended, such as a period of time when the vehicle is automatically stopped by idle stop control (which will be described later). More specifically, heat of the refrigerant is stored in the evaporator 20 through heat exchange between the refrigerant fed to the evaporator 20 by driving the compressor 16 and the cold-storage agent 30. Subsequently, when the compressor 16 is suspended, air fed from the evaporator fan 28 is cooled through heat exchange between the air fed from the evaporator fan 28 and the cold-storage agent 30, and then supplied to the passenger compartment via the air blow-off port, thereby cooling the passenger compartment while the compressor 16 is suspended. A refrigerant-temperature sensor 32 that detects a refrigerant temperature is provided in proximity to an inlet port of the evaporator 20. The refrigerant discharged from the evaporator 20 is suctioned into the compressor 16 via an inlet port of the compressor 16.

The power generation system includes an alternator 34 and a battery 36. The alternator 34 includes a regulator (not shown) and a rotor coil (not shown), and is rotationally driven by the rotating crankshaft 14 via the belt 22 to generate electrical power. More specifically, a power output of the alternator 34 is adjusted by the regulator adjusting an electrical current flowing through the rotor coil. As the power output of the alternator 34 becomes larger, a drive torque (alternator torque) for the alternator 34 increases. An output voltage of the alternator 34 is set to a voltage larger than a voltage (electromotive force) of the battery 36.

The alternator 34 is electrically connected to the battery 36, which in turn is electrically connected to the compressor fan, the evaporator fan 28, and other electrical loads 38 in parallel with each other. The battery 36 is charged with the power output of the alternator 34. The battery 36 is also a power supply source for the vehicle electrical load 38. In the present embodiment, it is assumed that the battery 36 is a lithium ion battery which is a high energy density battery. This configuration can increase a maximum charging power allowable for the battery 36 and the power output of the alternator 34 through the regenerative control which will be described later. As shown in FIG. 1, the battery 36 is provided with a voltage sensor 40 that detects a voltage of the battery 36 and a current sensor 42 that detects an input/output current of the battery 36.

An ECU (hereinafter referred to as an engine-control ECU 44) that controls the engine system is composed of a microcomputer including well-known CPU, ROM, and RAM. The engine-control ECU 44 receives output signals of an accelerator-pedal sensor 46 that detects an accelerator-pedal depression amount, a brake-pedal sensor 48 that detects a brake-pedal depression amount, and a vehicle speed sensor 50 that detects a travelling speed. The engine-control ECU 44 performs various control programs stored in the ROM or the like in response to the inputs to perform combustion control of the engine 10, such as fuel injection control of the fuel injection valve 12, and idle stop control.

The idle stop control is such that the engine 10 is automatically stopped upon stop of fuel injection from the fuel injection valve 12 when a predetermined stopping condition is met, and then the engine 10 is restarted by drive control of a starter (not shown) when a predetermined restarting condition is met. The stopping condition may be, for example, that a value of logical AND operation on values of the following two propositions is 1 (true), where one of the two propositions is that a travelling speed derived from an output value of the vehicle speed sensor 50 is 0 and the other one of the two propositions is that the brake pedal is being depressed. Whether or not the brake pedal is being depressed can be determined on the basis of whether or not the brake-pedal depression amount derived from an output value of the brake-pedal sensor 48 is 0.

The engine-control ECU 44 performs fuel-cut control for stopping supply of fuel from the fuel injection valve 12 as the above fuel injection control. The fuel-cut control is performed, for example, when it is determined that the engine revolution speed becomes equal to or larger than a prescribed revolution speed during the accelerator pedal not being depressed. Whether or not the accelerator pedal is not being depressed may be determined, for example, on the basis of whether or not the accelerator-pedal depression amount derived from an output value of the accelerator-pedal sensor 46 is 0.

An ECU (hereinafter referred to as an accessory-control ECU 52) that controls vehicle-mounted accessories, such as the alternator 34 and the compressor 16, is composed of a microcomputer including well-known CPU, ROM, and RAM. The accessory-control ECU 52 receives output signals of the air conditioning switch 54, the refrigerant-temperature sensor 32, the voltage sensor 40, and the current sensor 42. The output signal of the air conditioning switch 54 includes a drive command for the compressor 16 to cool the passenger compartment. The accessory-control ECU 52 performs various control programs stored in the ROM or the like according to the output signals to perform air-conditioning control of the passenger compartment, such as drive control of the compressor 16 and air volume control of the evaporator fan 28, and drive control of the alternator 34.

The engine-control ECU 44 and the accessory-control ECU 52 communicate information with each other. More specifically, the engine-control ECU 44 receives the output signal of the air conditioning switch 54 and information on the compressor torque through the accessory-control ECU 52. The accessory-control ECU 52 receives the output signals of the accelerator-pedal sensor 46, the brake-pedal sensor 48, and the vehicle speed sensor 50 through the engine-control ECU 44. Practically, the compressor 16 and the alternator 34 are controlled by respective ECUs, which are collectively designated as the accessory-control ECU 52 in FIG. 1.

The drive control of the alternator 34 is performed by controlling power supply to the alternator 34 so that an actual SOC of the battery 36 can reach a target value of SOC (target SOC) under feedback control. The actual SOC is calculated, for example, on the basis of a battery voltage derived from an output value of the voltage sensor 40 and a battery current derived from an output value of the current sensor 42.

The drive control of the compressor 16 is performed by controlling power supply to the compressor 16 so that an actual heat quantity stored in the evaporator 20 (actual cold storage capacity of the evaporator) can reach a target value (target cold storage capacity) under feedback control. The actual cold storage capacity is calculated, for example, on the basis of a refrigerant temperature derived from an output value of the refrigerant-temperature sensor 32.

In the present embodiment, the regenerative control is performed, during deceleration of the vehicle (i.e., during braking by the driver) under the fuel-cut control, to drive the alternator 34 and the compressor 16 to convert the kinetic energy of the vehicle into drive energy of the alternator 34 and the compressor 16. The regenerative control may reduce, for example, a subsequent frequency at which the alternator 34 is driven to charge the battery 36, which leads to enhancement of the enhance fuel efficiency of the engine 10.

However, when the SOC of the battery 36 and the cold storage capacity of the evaporator 20 are already at or around a target level before activation of the regenerative control, kinetic energy of the vehicle cannot be effectively used as drive energy of the alternator 34 and others through the regenerative control, which may reduce the fuel efficiency of the engine 10.

In consideration of the above, in the present embodiment, a target SOC of the battery 36 and a target cold storage capacity of the evaporator 20 are set during a vehicle running period of time other than a regenerative control period of time so that the battery 36 has a margin for storing electrical power and the evaporator 20 has a margin for storing heat during the regenerative control period of time. This allows kinetic energy of the vehicle to be effectively used as drive energy of the alternator 34 and other accessories through the regenerative control, which leads to enhancement of the enhance fuel efficiency of the engine 10.

There will now be explained the drive control of the alternator 34 and the compressor 16 with reference to FIG. 2.

FIG. 2 shows a functional block diagram for the drive control of the alternator 34 and the compressor 16 to be performed by the accessory-control ECU 52. In particular, the drive control of the compressor 16 is preceded by turn-on of the air conditioning switch 54.

A target SOC calculator B1 calculates the target SOC of the battery 36 on the basis of current electrical power supplied from the alternator 34 to the vehicle electrical load 38 and the evaporator fan 28 and others (actual power consumption) and a travelling speed V of the vehicle. More specifically, as actual power consumption becomes larger, the target SOC is set to a larger value. This is because there has to be ensured the power to be supplied to the vehicle electrical load 38 and others during automatic stop of the engine 10 under idle stop control. The actual power consumption may be calculated on the basis of a current drive state of the vehicle electrical load 38 and others.

In addition, as the travelling speed V of the vehicle becomes higher, the target SOC is set to a smaller value. This is because kinetic energy of the vehicle can be effectively used as drive energy of the alternator 34 without the brake system converting kinetic energy of the vehicle into thermal energy during deceleration of the vehicle due to braking operation by the driver, thereby preventing deterioration in drivability.

In other words, as the travelling speed V of the vehicle becomes higher, the kinetic energy of the vehicle becomes larger, which leads to a larger amount of electrical power that the alternator 34 can generate during deceleration of the vehicle under the regenerative control. Therefore, setting of the target SOC to a smaller value for a higher travelling speed V of the vehicle allows the battery 36 to have a margin corresponding to an amount of electrical power that the alternator 34 can generate under the regenerative control. This allows the kinetic energy of the vehicle to be effectively used as power generation energy of the alternator 34 during the regenerative control, thereby enhancing fuel efficiency of the engine 10.

Further, setting of the target SOC to a larger value for a lower travelling speed V of the vehicle can also prevent deterioration in drivability. This is because, for example, when the regenerative control is performed to drive the alternator 34 with a predetermined alternator torque and the actual SOC then reaches the target SOC before the end of the regenerative control, electrical power to be subsequently produced by driving the alternator 34 decreases rapidly, which may lead to reduction in alternator torque and thus to deterioration in drivability. In particular, in the present embodiment where the battery 36 is a lithium ion battery, since the battery 36 needs a relatively large maximum charging power, the alternator torque tends to become larger, which may lead to a significantly large degree of rapid decrease in alternator torque and thus to significant deterioration in drivability. As described above, setting of the target SOC to a larger value for a lower travelling speed V during deceleration of the vehicle allows the target SOC to increase gradually during the regenerative control, which may lead to prevention of the actual SOC reaching the target SOC before the end of the regenerative control and thus to suppression of the drivability deterioration.

There will now be explained in more detail a setting process of the target SOC. The target SOC may be calculated on the basis of a map defining a correspondence relation between the travelling speed V of the vehicle and the target SOC. For example, in the present embodiment, the target SOC may be set to an upper limit of a use range which is considered to be the SOC of the battery 36 at the time that the running vehicle stops without braking and accelerating operations by the driver while the alternator 34 is being driven with a predetermined torque to charge the battery 36.

The above map may be prepared by dividing a use range of the travelling speed V of the vehicle into a plurality of intervals to reduce a workload for setting the target SOC as a function of the travelling speed V of the vehicle, where the target SOC takes a constant value over each interval (see a dotted line of an upper block B1 in FIG. 2). That is, the target SOC takes discrete values.

The SOC deviation calculator B2 calculates a deviation $\Delta a$ between the actual SOC and the target SOC. More specifically, the deviation $\Delta a$ is a value obtained by subtracting the actual SOC from the target SOC.

The alternator FB-controller B3 calculates a command value for the alternator torque (hereinafter referred to as an alternator command value Ta) such that the actual SOC of the battery 36 can reach the target SOC under feedback control. More specifically, the alternator command value Ta is calculated by performing the proportional-integral control (PI-control) on the basis of the deviation $\Delta a$ between the actual SOC and the target SOC. In the present embodiment, a proportional gain Kap used in the feedback control is set larger for a larger absolute value of the deviation Δa, which leads to enhancement of controllability of the actual SOC.

In this scheme, the proportional gain Kap is set smaller for a smaller absolute value of the deviation Δa between the actual SOC and the target SOC, which can suppress a fluctuation in alternator torque caused by a fluctuation of the actual SOC around the target SOC. On the other hand, the proportional gain Kap is set larger for a larger absolute value of the deviation Δa, which allows the actual SOC to reach the target SOC more rapidly.

The target cold storage capacity calculator B4 calculates the target cold storage capacity on the basis of a cooling load and a travelling speed V of the vehicle. More specifically, the target cold storage capacity is set larger for a larger cooling load, and is set smaller for a higher travelling speed V of the vehicle. A reason why the target cold storage capacity is set larger for a larger cooling load is to ensure a larger heat quantity for cooling the passenger compartment during automatic stop of the engine 10 under the idle stop control. The cooling load may be calculated, for example, on the basis of a temperature difference between a temperature inside the passenger compartment and its target temperature, and an amount of air fed from the evaporator fan 28.

Similarly to the process performed by the target SOC calculator B1, setting the target cold storage capacity to a smaller value for a higher travelling speed V of the vehicle is for effectively using kinetic energy of the vehicle as drive energy of the compressor 16 and for suppressing the drivability deterioration.

Similarly to the setting of the target SOC as described above, the target cold storage capacity may be calculated on the basis of another map defining a correspondence relation between the travelling speed V of the vehicle and the target cold storage capacity. Also similarly to the setting of the target SOC, the above map may be prepared by dividing a use range of the travelling speed V of the vehicle into a plurality of intervals to reduce a workload for setting the target cold storage capacity as a function of the travelling speed V of the vehicle, where the target cold storage capacity takes a constant value over each interval (see a dotted line of a lower block B4 in FIG. 2). That is, the target cold storage capacity takes discrete values.

The cold storage capacity deviation calculator B5 calculates a deviation Δc between the target cold storage capacity and the actual cold storage capacity. More specifically, the deviation Δc is calculated by subtracting the actual cold storage capacity from the target cold storage capacity.

The compressor FB-controller B6 calculates a command value for the compressor torque (hereinafter referred to as a compressor command value Tc) such that the actual cold storage capacity can reach the target cold storage capacity under feedback control. Similarly to the calculation of the alternator command value Ta, the compressor command value Tc is calculated by performing the proportional-integral control (PI-control) on the basis of the deviation Δc between the target cold storage capacity and the actual cold storage capacity. A proportional gain Kcp used in the feedback control is set larger for a larger absolute value of the deviation Δc.

The deceleration requirement calculator B7 calculates a deceleration requirement for the vehicle. The deceleration requirement is calculated to be larger as an accelerator-pedal depression amount is decreased and/or a brake-pedal depression amount is increased. A reason why the accelerator-pedal depression amount is used to calculate the deceleration requirement is for taking into account the fact that the vehicle can also be decelerated by decreasing the accelerator-pedal depression amount. More specifically, the deceleration requirement may be calculated by using a map defining a correspondence relation between the decreased amount of accelerator-pedal depression, the brake-pedal depression amount, and the deceleration requirement. The map may be previously determined by experiment.

The torque limiter B8 calculates the alternator command value Ta and the compressor command value Tc such that a sum of the alternator command value Ta and the compressor command value Tc is equal to or smaller than an allowable upper limit Tmax for the sum, thereby suppressing drivability deterioration caused by increase in alternator torque and/or compressor torque. The allowable upper limit Tmax is set larger for a larger deceleration requirement, which maximizes a conversion rate of kinetic energy of the vehicle into drive energy of the alternator 34 and the compressor 16 through the regenerative control while suppressing the drivability deterioration.

In other words, in the case of an increasing deceleration requirement for the vehicle, since the driver intends to decelerate the vehicle even when the alternator torque and the compressor torque are increased through the regenerative control, it can be assumed that the driver is given as little discomfort as possible. Therefore, setting of the allowable upper limit Tmax to a larger value for a larger deceleration requirement allows the sum of the alternator command value Ta and the compressor command value Tc to increase so that drive energy of the alternator 34 and the compressor 16 is increased prior to an amount of kinetic energy of the vehicle being decreased through braking of the vehicle.

Further in the present embodiment, the sum of the alternator command value Ta and the compressor command value Tc is limited to or under the allowable upper limit Tmax while maintaining a ratio of the compressor command value Tc to the alternator command value Ta. This enables the alternator 34 and the compressor 16 to be properly driven as a function of a degree of demand for charging the battery and a degree of demand for air-conditioning the passenger compartment.

A resultant alternator command value Ta and a resultant compressor command value Tc are calculated in the torque limiter B8 as follows. In the torque limiter 88, when it is determined that the sum of the alternator command value Ta calculated by the alternator FB-controller B3 and the compressor command value Tc calculated by the compressor FB-controller B6 is equal to or smaller than the allowable upper limit Tmax, the alternator command value Ta calculated by the alternator FB-controller B3 and the compressor command value Tc calculated by the compressor FB-controller B6 are outputted as the resultant alternator command value Ta and the resultant compressor command value Tc, respectively. On the other hand, when it is determined that the sum of the alternator command value Ta calculated by the alternator FB-controller B3 and the compressor command value Tc calculated by the compressor FB-controller B6 exceeds the allowable upper limit Tmax, the resultant alternator command value Ta to be outputted from the torque limiter B8 is given by dividing the alternator command value Ta calculated by the alternator FB-controller B3 by the sum of the alternator command value Ta calculated by the alternator FB-controller B3 and the compressor command value Tc calculated by the compressor FB-controller B6 and then multiplying the quotient by the allowable upper limit Tmax, and the resultant compressor command value Tc to be outputted from the torque limiter B8 is given by dividing the compressor command value Tc calculated by the compressor FB-controller B6 by the sum of the alternator command value Ta calculated by the alternator FB-controller B3 and the compressor command value Tc calculated by the compressor FB-controller B6 and then multiplying the quotient by the allowable upper limit Tmax.

In the present embodiment, the allowable upper limit Tmax is set to zero when the deceleration requirement is equal to or smaller than a predetermined value below zero (where the predetermined value may be zero). This allows the power generation of the alternator 34 to be ceased and the generated torque of the engine 10 to be efficiently used for driving the vehicle when a degree of acceleration of the vehicle is large.

There will now be explained with reference to FIG. 3 a drive control process for the vehicle-mounted accessories in accordance with the present embodiment. This process is performed repeatedly by the accessory-control ECU 52 at a predetermined time interval.

This process starts with calculation of the target SOC and the target cold storage capacity in step S10 in a manner as described above.

Subsequently, in step 512, the alternator command value Ta and the compressor command value Tc are calculated by the alternator FB-controller B3 and the compressor FB-controller B6, respectively. In step S14, in the torque limiter 88, the sum of the alternator command value Ta and the compressor command value Tc is limited to or under the allowable upper limit Tmax to obtain the resultant alternator command value Ta and the resultant compressor command value Tc.

In step S16, the drive control of the alternator 34 is performed on the basis of the resultant alternator command value Ta, and the drive control of the compressor 16 is performed on the basis of the resultant compressor command value Tc.

The process in this cycle is ended after the operation of step S16 is completed.

FIG. 4 shows a timing chart for the drive control of the alternator 34 in accordance with the present embodiment. More specifically, FIG. 4 shows (a) changes in travelling speed V of the vehicle, (b) changes in braking state where "OFF" indicates that the brake-pedal depression amount is zero and "ON" indicates that the brake-pedal depression amount is above zero, (c) changes in SOC of the battery 38, (d) changes in alternator command value Ta, and (e) changes in fuel-cut control state.

As shown in FIG. 4, the engine 10 is restarted at the time t1 under the idle stop control. The feedback control on the basis of the deviation Δa between the target SOC and the actual SOC is commenced immediately after the vehicle has started to accelerate. In the feedback control, the target SOC is set smaller for a higher travelling speed V of the vehicle. Subsequently, the accelerator pedal depression amount becomes zero (i.e., the accelerator pedal is released by the driver) at the time t2, which leads to increase in deceleration requirement and thus to increase in allowable upper limit Tmax. At the same time, the fuel-cut control and the regenerative control are started, and the target SOC is increased as the travelling speed V of the vehicle decreases. During a time period from t3 to t4, the torque limiting process as described above with reference to FIG. 2 is performed for limiting the alternator command value Ta on the basis of the allowable upper limit Tmax. Subsequently, the braking operation is performed at the time t4, which also leads to increase in deceleration requirement and thus to further increase in allowable upper limit Tmax. This allows the alternator command value Ta to be increased at the time t4.

Summary of the Embodiment

There will now be explained advantages of the present embodiment.

(1) In the drive-control of the alternator 34 and the compressor 16, the target SOC of the battery 36 and the target cold storage capacity of the evaporator 20 are set during a vehicle running period of time other than a regenerative control period of time so that the battery 36 has a margin for storing electrical power and the evaporator 20 has a margin for storing heat. This allows energy generated through the regenerative control to be stored (or accumulated) adequately in the battery 36 and the evaporator 20, which leads to desired enhancement of the fuel efficiency of the engine 10.

(2) The target SOC is set smaller for a higher travelling speed V of the vehicle. This can increase a conversion rate of kinetic energy of the vehicle into drive energy of the alternator 34 and the compressor 16 and others through the regenerative control while suppressing the drivability deterioration due to rapid decrease in alternator torque or the like during the regenerative control.

It should be noted that in general, as the travelling speed V of the vehicle becomes higher, kinetic energy of the vehicle becomes larger, which leads to a larger amount of energy (electrical energy and/or thermal energy) to be generated by the vehicle-mounted accessories (alternator and/or compressor) through the regenerative control.

(3) The proportional gain Kap used in the feedback control is set larger for a larger absolute value of the deviation Δa between the target SOC and the actual SOC and the proportional gain Kcp used in the feedback control is set larger for a larger absolute value of the deviation Δc between the target cold storage capacity and the actual cold storage capacity, which allows the SOC of the battery 36 and the cold storage capacity of the evaporator 20 to be controlled properly.

(4) The sum of the alternator command value Ta and the compressor command value Tc is limited to or under the allowable upper limit Tmax that is set larger for a larger deceleration requirement. This enables the alternator 34 and the compressor 16 to be driven with the driver being given as little discomfort as possible during accelerating and/or braking of the vehicle, thereby suppressing the drivability deterioration. In addition, the kinetic energy of the vehicle can be effectively used as drive energy of the alternator 34 and others before the kinetic energy of the vehicle is decreased due to deceleration of the vehicle.

(5) The sum of the alternator command value Ta and the compressor command value Tc is limited to or under the allowable upper limit Tmax while maintaining a ratio of the compressor command value Tc to the alternator command value Ta. This enables the battery 36 to be properly charged as a function of a degree of battery charge request and the evaporator 20 to properly store (or accumulate) heat as a function of a degree of cold storage request.

Without such a torque limiting process, when the sum of the alternator command value Ta and the compressor command value Tc exceeds the allowable upper limit Tmax, a surplus of torques will be discarded without being used as drive energy of the alternator and the compressor and others (vehicle-mounted accessories).

Other Embodiment

In the above embodiment, the allowable upper limit Tmax is set larger for a larger deceleration requirement. Alternatively, the allowable upper limit Tmax may be set larger for a larger brake-pedal depression amount.

In the above embodiment, the battery 36 is a lithium ion battery. Alternatively, the battery 36 may be a lead battery.

In the above embodiment, the compressor 16 is a continuously variable displacement type compressor. Alternatively, the compressor 16 may be a fixed-displacement type compressor whose discharge capacity is kept constant while being driven, where there is provided for performing drive control of the compressor 16 an electromagnetic clutch that transfers (in an ON-state) and interrupts (in an OFF-state) rotary power of the crankshaft 14 from the crankshaft 14 to the drive shaft of the compressor 16 through control of power supply to the electromagnetic clutch. More specifically, an operation rate, which is given by dividing an ON-period of time by a prescribed period of time, is adjusted so that an actual cold storage capacity can reach a target cold storage capacity, where the operation rate of 1 may be defined such that the compressor 16 is driven at a maximum discharge capacity.

In the above embodiment, the evaporator 20 also serves as a heat accumulator that includes a cold-storage agent 30 encapsulated therein. Alternatively, the evaporator 20 may not serve as a heat accumulator.

In the above embodiment, the target SOC and/or the target cold storage capacity are set smaller for a higher travelling speed V of the vehicle. Additionally or alternatively, the target SOC and/or the target cold storage capacity may be set smaller when it is determined that the vehicle is traveling downhill than when it is determined that the vehicle is traveling on level ground on the basis of an output value of a sensor that detects a pavement gradient. With this configuration, rapid decrease in alternator torque which occurs when the actual SOC reaches the target SOC due to increase in kinetic energy of the vehicle when the vehicle is traveling downhill may be suppressed as much as possible.

In the above embodiment, the vehicle supports the idle stop control. Alternatively, the vehicle may not support the idle stop control.

In the above embodiment, the alternator command value Ta and the compressor command value Tc are calculated by means of the PI control. Alternatively, the alternator command value Ta and the compressor command value Tc may be calculated by means of the proportional-integral-derivative control (PID-control) or the proportional control (P-control).

Alternatively to the drive control of the vehicle-mounted accessories in the above embodiment, the drive control of the vehicle-mounted accessories may be performed with drive torque being fixed at a predetermined torque during the regenerative control. With this configuration, fluctuations in drive torque of the vehicle-mounted accessories during the regenerative control can be suppressed, which leads to desirable suppression of the drivability deterioration.

In the above embodiment, the target SOC of the battery 36 and the target cold storage capacity of the evaporator 20 are set during a vehicle running period of time other than a regenerative control period of time so that the battery 36 has a margin for storing electrical power and the evaporator 20 has a margin for storing heat. Alternatively, the SOC of the battery 36 and the cold storage capacity of the evaporator 20 may be controlled during a vehicle running period of time other than a braking period of time so that the actual SOC is kept smaller than an upper limit of the SOC of the battery 36 by a predetermined amount of SOC and the actual cold storage capacity of the evaporator 20 is kept smaller than an upper limit of the cold storage capacity of the evaporator 20 by a predetermined amount of cold storage capacity.

In the above embodiment, the torque limiting process is performed on the basis of the allowable upper limit Tmax, where the alternator command value Ta and the compressor command value Tc are calculated such that a sum of the alternator command value Ta and the compressor command value Tc is equal to or smaller than the allowable upper limit Tmax. Alternatively, the sum of the alternator command value Ta and the compressor command value Tc may be limited to or under the allowable upper limit Tmax while maintaining a ratio of a compressor torque requirement to an alternator torque requirement. The alternator torque requirement is a ratio of an actual alternator torque to an alternator maximum drive torque which is an alternator torque when the alternator 34 is driven to output maximum power as a function of a revolution speed of the alternator 34. The power output of the alternator 34 becomes larger as the alternator torque requirement increases. The compressor torque requirement is a ratio of an actual compressor torque to a compressor maximum drive torque which is a compressor torque when the compressor 16 is driven at a maximum discharge capacity. The discharge capacity of the compressor 16 becomes larger as the compressor torque requirement increases. In the alternative torque limiting procedure on the basis of the ratio of the compressor torque requirement to the alternator torque requirement, the actual alternator torque is normalized by the alternator maximum drive torque and the compressor torque, is normalized by the compressor maximum drive torque. Therefore, even in the case of a large difference between the alternator maximum drive torque and the compressor maximum drive torque, this allows the battery 36 to be charged to properly reflect a degree of demand for charging the battery 36 and the evaporator 20 to store heat to properly reflect a degree of demand for air-conditioning the passenger compartment.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A control apparatus for a vehicle, the vehicle being provided with at least one electronically controllable vehicle-mounted accessory that can be driven by an internal-combustion engine, and energy storage means for storing energy generated by the at least one accessory being driven by the engine, the apparatus comprising:
    regenerative control means for performing regenerative control during deceleration of the vehicle according to a deceleration instruction from a driver of the vehicle by driving the at least one accessory to convert kinetic energy of the vehicle into drive energy of the at least one accessory; and
    drive-control means for performing drive-control of the at least one accessory during a vehicle running period other than a regenerative control period so that the energy storage means has a margin in energy storage capacity for storing energy to be generated by the at least one accessory being driven by the engine during the regenerative control.

2. The apparatus of claim 1, wherein the drive-control means comprises:
    target energy storage capacity setting means for setting a target energy storage capacity that becomes smaller for a higher travelling speed of the vehicle; and
    drive-torque control means for calculating a drive torque of the at least one accessory such that an actual energy storage capacity of the energy storage means can reach the target energy storage capacity set by the target energy storage capacity setting means.

3. The apparatus of claim 2, wherein the drive-torque control means calculates the drive torque of the at least one accessory on the basis of a deviation between the actual energy storage capacity and the target energy storage capacity set by the target energy storage capacity setting means by using feedback control.

4. The apparatus of claim 3, wherein the feedback control is proportional-integral (PT) control such that a proportional gain used in the proportional-integral control is set larger for a larger absolute value of the deviation.

5. The apparatus of claim 1, wherein the at least one accessory comprises an alternator,
the energy storage means comprises a battery that stores electrical energy generated by the alternator being driven by the engine.

6. The apparatus of claim 1, wherein the at least one accessory comprises a compressor for air-conditioning a passenger compartment of the vehicle,
the energy storage means comprises a heat accumulator that stores heat energy generated by the compressor being driven by the engine.

7. The apparatus of claim 2, wherein the drive-control means further comprises:
deceleration calculation means for calculating a deceleration requirement of the vehicle;
upper-limit setting means for setting an allowable upper limit of the drive torque of the at least one accessory that becomes larger for a larger deceleration requirement calculated by the deceleration calculation means; and
drive-torque limiting means for limiting the drive torque of the at least one accessory to be equal to or smaller than the allowable upper limit set by the upper-limit setting means.

8. The apparatus of claim 7, wherein the at least one accessory comprises an alternator and a compressor for air-conditioning a passenger compartment of the vehicle,
the energy storage means comprises a battery that stores electrical energy generated by the alternator being driven by the engine and a heat accumulator that stores heat energy generated by the compressor being driven by the engine, and
the drive-torque limiting means limits a sum of the drive torque of the alternator and the drive torque of the compressor to be equal to or smaller than the allowable upper limit set by the upper limit setting means while maintaining a ratio of the drive torque of the compressor to the drive torque of the alternator.

9. The apparatus of claim 7, wherein the at least one accessory comprises an alternator and a compressor for air-conditioning a passenger compartment of the vehicle,
the energy storage means comprises a battery that stores electrical energy generated by the alternator being driven by the engine and a heat accumulator that stores heat energy generated by the compressor being driven by the engine, and
the drive-torque limiting means limits a sum of the drive torque of the alternator and the drive torque of the compressor to be equal to or smaller than the allowable upper limit set by the upper limit setting means while maintaining a ratio of a compressor torque requirement to an alternator torque requirement, wherein the alternator torque requirement is a ratio of an actual drive torque of the alternator to a maximum drive torque of the alternator which is a drive torque of the alternator when the alternator is driven to output a maximum power as a function of a revolution speed of the alternator, and the compressor torque requirement is a ratio of an actual drive torque of the compressor to a maximum drive torque of the compressor which is a drive torque of the compressor when the compressor is driven at a maximum discharge capacity.

10. The apparatus of claim 7, wherein the deceleration calculation means calculates the deceleration requirement of the vehicle on the basis of a decreased amount of accelerator-pedal depression and an increased amount of brake-pedal depression such that the deceleration requirement becomes larger as the decreased amount of accelerator-pedal depression or the increased amount of brake-pedal depression is increased.

11. The apparatus of claim 2, further comprises a pavement-gradient sensor that detects a pavement gradient, wherein
the drive-control means further comprises downhill-slope detection means for determining whether or not the vehicle is traveling downhill on the basis of the pavement gradient detected by the pavement-gradient sensor,
the target energy storage capacity setting means setts the target energy storage capacity that is smaller when it is determined that the vehicle is traveling downhill than when it is determined that the vehicle is traveling on level ground.

* * * * *

UNITED STATES PATENT AND TRADEMARK OFFICE
CERTIFICATE OF CORRECTION

| | | |
|---|---|---|
| PATENT NO. | : 9,090,262 B2 | Page 1 of 1 |
| APPLICATION NO. | : 13/302249 | |
| DATED | : July 28, 2015 | |
| INVENTOR(S) | : Aoyagi | |

It is certified that error appears in the above-identified patent and that said Letters Patent is hereby corrected as shown below:

In the claims

Column 13, Claim 4, line 2, "proportional-integral (PT)" should be ---proportional-integral (PI)---.

Column 14, Claim 11, line 8, "setts" should be ---sets---.

Signed and Sealed this
Twelfth Day of January, 2016

Michelle K. Lee
*Director of the United States Patent and Trademark Office*